Patented Dec. 22, 1925.

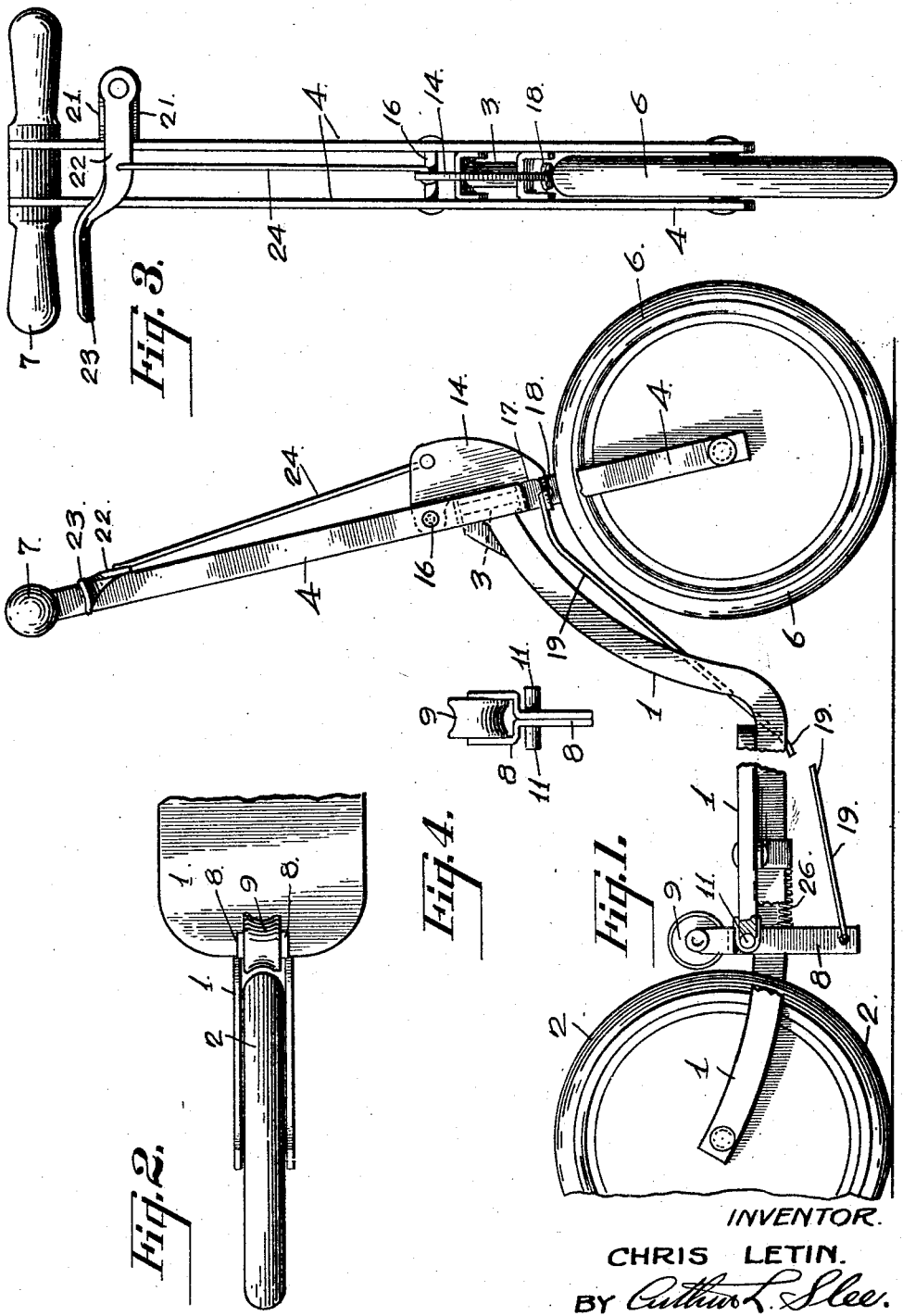

1,566,487

UNITED STATES PATENT OFFICE.

CHRIS LETIN, OF SAN FRANCISCO, CALIFORNIA.

BRAKE FOR SCOOTERS AND COASTERS.

Application filed January 24, 1925. Serial No. 4,529.

*To all whom it may concern:*

Be it known that I, CHRIS LETIN, a citizen of the United States, residing in the city and county of San Francisco and State of California, have invented a new and useful Improvement in a Brake for Scooters and Coasters, of which the following is a specification.

My invention relates to an improved article of manufacture consisting of a brake for scooters and coasters of the tandem type, wherein a few parts of simple, inexpensive and efficient construction may be easily and quickly applied to a scooter.

The present state of the art discloses scooters and coasters of the tandem type by means of which children propel themselves along the sidewalks and pavements, by supporting the body on one foot upon the scooter, and propel themselves and the scooter by means of the other foot.

In a great many cities and localities there are no hills or inclinations and for this reason a great many of these scooters and coasters are provided without brakes. In other localities children take advantages of hills and inclinations of the sidewalks and pavement to propel the vehicle by the action of gravity and in the case of steep grades considerable speed may be attained.

Where some of these inclinations or grades terminate at dangerous traffic arteries, it is desirable that the coasters and scooters should be equipped with brakes in order that the vehicle may be easily and quickly stopped at the bottom of the grade to prevent carrying the operator into vehicular traffic or other dangerous obstructions.

The object of the present invention, then, is to provide a new article of manufacture consisting of or comprising a brake which may be of few, simple and inexpensive parts applied easily to a scooter or coaster not originally equipped with brakes.

Another object of the invention is to provide a simple, efficient and inexpensive brake which may be applied at the factory if desired.

A further object of the invention is to provide a scooter brake which may be applied to the rear wheel and actuated from the handle bars of the steering fork of the scooter or coaster, and pivotally connected in such a manner that turning of the steering fork or handle bars will not apply the brakes.

I accomplish these and other objects by means of the details of construction disclosed in the drawings forming a part of the present specification wherein like characters are used to designate similar parts throughout the said specification and drawings, and in which—

Fig. 1 is a broken side elevation, partly in section, of a scooter disclosing my improved brake applied thereto;

Fig. 2 is a broken plan view of the rear or body portion of the scooter and my brake applied thereto;

Fig. 3 is a front elevation of the scooter disclosing the steering fork and handle bars and the manner in which the brake is mounted thereon; and Fig. 4 is a detailed view of the brake lever and roller thereon.

Referring to the drawings the numeral 1 is used to designate the main frame or body of a standard scooter upon the rear end of which is mounted the rear wheel 2. The front end of the body is pivotally connected as at 3 to the steering fork 4 upon the lower end of which is rotatably mounted the front wheel 6 while a suitable handle or handle bar 7 is mounted upon the upper end of the steering fork 4.

My invention consists of a vertically disposed bifurcated brake lever 8 having a brake roller 9 rotatably mounted between the bifurcations thereof and provided with a concaved tread arranged for engagement with the tread of the rear wheel 2, as disclosed in Fig. 2 of the drawings. The brake lever 8 is provided with pins 11 by means of which the brake lever may be pivotally suspended with the roller 9 uppermost and adjacent the rear wheel 2.

What I term a sector 14 is vertically disposed and pivotally mounted at its upper end upon the steering fork 4, as at 16, said sector having a straight side or edge 17 arranged to rest against the fork 4 when said sector is in its extreme lowermost position. The lower end of the sector 14 is provided with a horizontal or lateral portion 18 having an aperture therein which is normally aligned with the pivot 3 of the steering fork 4 when said sector 14 is in a normal or inoperative position. A suitable connecting rod 19 has one end connected pivotally through the aperture in the lower end 18 of the sector 14 and the other end is pivotally connected to the lower end of the brake lever 8.

A bracket 21 is securely fastened to the steering fork 4 and adjacent the upper end thereof and pivotally mounted upon this bracket is hand lever 22 having an offset portion 23 projecting slightly under one of the handle bars 7 of the steering fork and in spaced relation thereto whereby said hand lever 22 may be actuated by grasping the offset portion 23 thereof and moving it upwardly.

The hand lever 23 is connected to the upper end of the sector 14 by means of a suitable connecting rod 24 so that when the hand lever 23 is raised toward the handle bar 7 the connecting rod 24 will raise the sector 14 which will in turn, as it is partially rotated upon its pivot 16, pull upon the connecting rod 19, and thereby move the brake lever 8; against the tension of a spring 26, interposed between the body 1 and the lower end of the lever 8, and move the brake roller 9 into frictional contact with the rear wheel 2.

The spring 26 has another function, and that is that by its tension against the brake lever 8 the connecting rod 19 is actuated to move and normally retain the sector 14 in its lowermost position with the straight side 17 thereof resting against the steering fork 4 and the aperture in the lower portion thereof in alignment with the steering pivot 3 of the vehicle. While this aperture is in alignment with said pivot 3 the steering fork may obviously be turned upon said pivot 3 without pulling upon or actuating the connecting rod 19 and consequently the rotation of the fork 4 upon its pivot 3 will be prevented from applying the brakes.

Having thus described my invention what I claim as new and desire to secure by Letters Patent is—

1. As a new article of manufacture, a brake for scooters and coasters of the tandem type comprising a vertically disposed lever pivotally mounted adjacent the rear wheel of said scooter; a brake roller rotatably mounted upon said lever and arranged to engage the tread of said wheel; a sector pivotally mounted upon the fork of the scooter and having an aperture in the free end thereof normally aligned with the vertical pivot of said fork with the body of the scooter; a connecting rod pivotally connected with the aperture at one end and the lower end of the brake lever at the other end thereof whereby rotation of the fork will be prevented from applying the brake; and means mounted adjacent the handle of said fork and operatively connected to the sector to operate the same.

2. As a new article of manufacture, a brake for scooters and coasters of the tandem type comprising a vertically disposed lever pivotally mounted adjacent the rear wheel of said scooter; a brake roller rotatably mounted upon said lever and arranged to engage the tread of said wheel; a sector pivotally mounted upon the fork of the scooter and having an aperture in the free end thereof normally aligned with the vertical pivot of said fork with the body of the scooter; a connecting rod pivotally connected with the aperture at one end and the lower end of the brake lever at the other end thereof whereby movement of said brake may be prevented when said fork is turned in steering; and means mounted adjacent the handle of said fork and operatively connected to the sector to operate the same; and means for normally retaining the aperture of the sector in alignment with the fork pivot whereby rotation of the fork will be prevented from applying said brake.

3. As a new article of manufacture, a brake for scooters and coasters of the tandem type comprising a vertically disposed lever pivotally mounted adjacent the rear wheel of said scooter; a brake roller rotatably mounted upon said lever and arranged to engage the tread of said wheel; a sector pivotally mounted upon the fork of the scooter and having an aperture in the free end thereof normally aligned with the vertical pivot of said fork with the body of the scooter; a connecting rod pivotally connected with the aperture at one end and with the lower end of the brake lever at the other end thereof whereby movement of said brake may be prevented when said fork is turned in steering; and means mounted adjacent the handle of said fork and operatively connected to the sector to operate the same; and a spring for normally retaining the aperture in the sector in alignment with the fork pivot whereby rotation of said fork upon said pivot will be prevented from applying said brake.

4. As an article of manufacture, a brake for scooters and coasters of the tandem type comprising a bifurcated lever pivotally mounted adjacent the rear wheel of said scooter; a brake roller having a concaved tread arranged for engagement with said wheel pivotally mounted between the bifurcations of said lever; means for normally holding the lever to prevent engagement of the roller thereon with said wheel; a vertically disposed sector pivotally mounted upon the fork of said scooter and having an aperture therein aligned with the fork pivot when said sector is in one extreme position; a connecting rod connecting at one end with said aperture and with the brake lever at the other end; a pivot bracket mounted upon the fork and adjacent the handle thereof; a hand lever pivotally connected to the fork and positioned under one side of said handle and in spaced relation thereto, to permit movement of said lever toward said fork; and a connecting rod conecting the hand lever and the sector whereby said sector and brake lever connected thereto may be actuated to move the brake roller into frictional engagement with the rear wheel.

5. As a new article of manufacture, a brake for scooters comprising a vertically disposed bifurcated lever pivotally mounted upon the body of said scooter and adjacent the rear wheel thereof; a brake roller having a concaved tread rotatably mounted between the bifurcations of said lever and arranged to engage the tread of the said wheel; a depending sector vertically disposed and pivotally mounted upon the steering fork of said scooter and having an aperture in the lower portion thereof aligned with the fork pivot of said scooter when said sector is in its extreme lowermost position against said fork; a connecting rod having one end pivotally engaging the aperture in the sector and the other end pivotally connected to the lower end of the brake lever; a bracket mounted adjacent the uper end of the steering fork of the scooter; a hand lever pivotally mounted upon said bracket and extending under the handle of said fork and in spaced relation thereto; and a connecting rod connecting said hand lever with the sector whereby said sector may be moved to actuate the first mentioned connecting rod and brake lever and roller connected thereto, to move said roller into frictional engagement with said rear wheel, when said hand lever is moved toward said fork handle.

6. As a new article of manufacture, a brake for scooters comprising a vertically disposed bifurcated lever pivotally mounted upon the body of said scooter and adjacent the rear wheel thereof; a brake roller having a concaved tread rotatably mounted between the bifurcations of said lever and arranged to engage the tread of said wheel; a depending sector vertically disposed and pivotally mounted upon the steering fork of said scooter and having an aperture in the lower portion thereof aligned with the fork pivot of said scooter when said sector is in its extreme lowermost position against said fork; a connecting rod having one end pivotally engaging the aperture in the sector and the other end pivotally connected to the lower end of the brake lever; a bracket mounted adjacent the upper end of the steering fork of the scooter; a hand lever pivotally mounted upon said bracket and extending under the handle of said fork and in spaced relation thereto; and a connecting rod connecting said hand lever with the sector whereby said sector may be moved to actuate the first mentioned connecting rod and brake lever and roller connected thereto, to move said roller into frictional engagement with said rear wheel, when said hand lever is moved toward said fork handle; and means for normally preventing engagement of the brake roller with the said rear wheel.

7. As a new article of manufacture, a brake for scooters comprising a vertically disposed bifurcated lever pivotally mounted upon the body of said scooter and adjacent the rear wheel thereof; a brake roller having a concaved tread rotatably mounted between the bifurcations of said lever and arranged to engage the tread of the said wheel; a depending sector vertically disposed and pivotally mounted upon the steering fork of said scooter and having an aperture in the lower portion thereof aligned with the fork pivot of said scooter when said sector is in its extreme lowermost position against said fork; a connecting rod having one end pivotally engaging the aperture in the sector and the other end pivotally connected to the lower end of the brake lever; a bracket mounted adjacent the upper end of the steering fork of the scooter; a hand lever pivotally mounted upon said bracket and extending under the handle of said fork and in spaced relation thereto; and a connecting rod connecting said hand lever with the sector whereby said sector may be moved to actuate the first mentioned connecting rod and brake lever and roller connected thereto, to move said roller into frictional engagement with said rear wheel, when said hand lever is moved toward said fork handle; and a spring interposed between the brake lever and the body of the scooter and arranged to normally prevent movement of said lever to bring the roller into frictional engagement with the said rear wheel.

8. As a new article of manufacture, a brake for scooters comprising a vertically disposed bifurcated lever pivotally mounted upon the body of said scooter and adjacent the rear wheel thereof; a brake roller having a concaved tread rotatably mounted between the bifurcations of said lever and arranged to engage the tread of the said wheel; a depending sector vertically disposed and pivotally mounted upon the steering fork of said scooter and having an aperture in the lower portion thereof aligned with the fork pivot of said scooter when said sector is in its extreme lowermost position against said fork; a connecting rod having one end pivotally engaging the aperture in the sector and the other end pivotally connected to the lower end of the brake lever; a bracket mounted adjacent the upper end of the steering fork of the scooter; a hand lever pivotally mounted upon said bracket and extending under the handle of said fork and in spaced relation thereto; and a connecting rod connecting said hand lever with the sector whereby said sector may be moved to actuate the first mentioned connecting rod and brake lever and roller connected thereto, to move said roller into frictional engagement with said rear wheel, when said hand lever is moved toward said fork handle; and means for normally retaining the sector in its lowermost position against said fork and the aperture therein in alignment with the pivot of said fork to prevent rotation of said fork upon its pivot from making application of said brakes.

In witness whereof I hereunto set my signature.

CHRIS LETIN.